Sept. 21, 1937.  E. W. W. KEENE  2,093,967
FILTER
Filed March 22, 1937   3 Sheets-Sheet 3
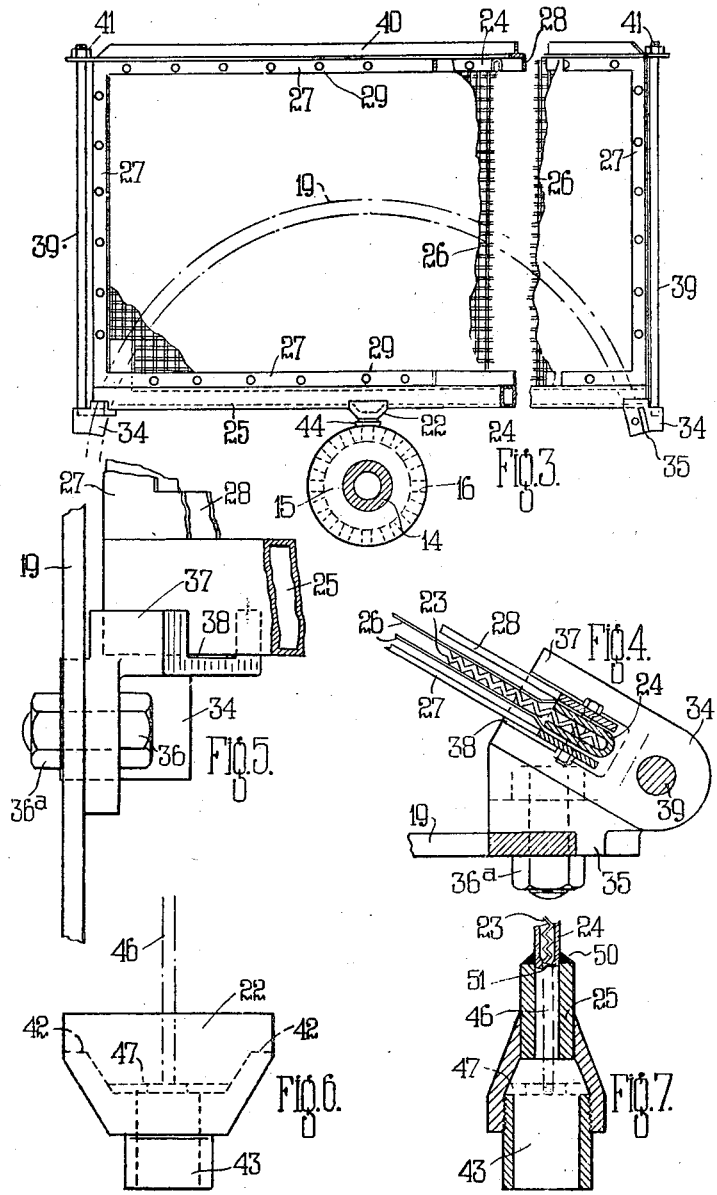
Inventor;
Edward W. W. Keene
By: Mason & Porter
Attorneys Patented Sept. 21, 1937

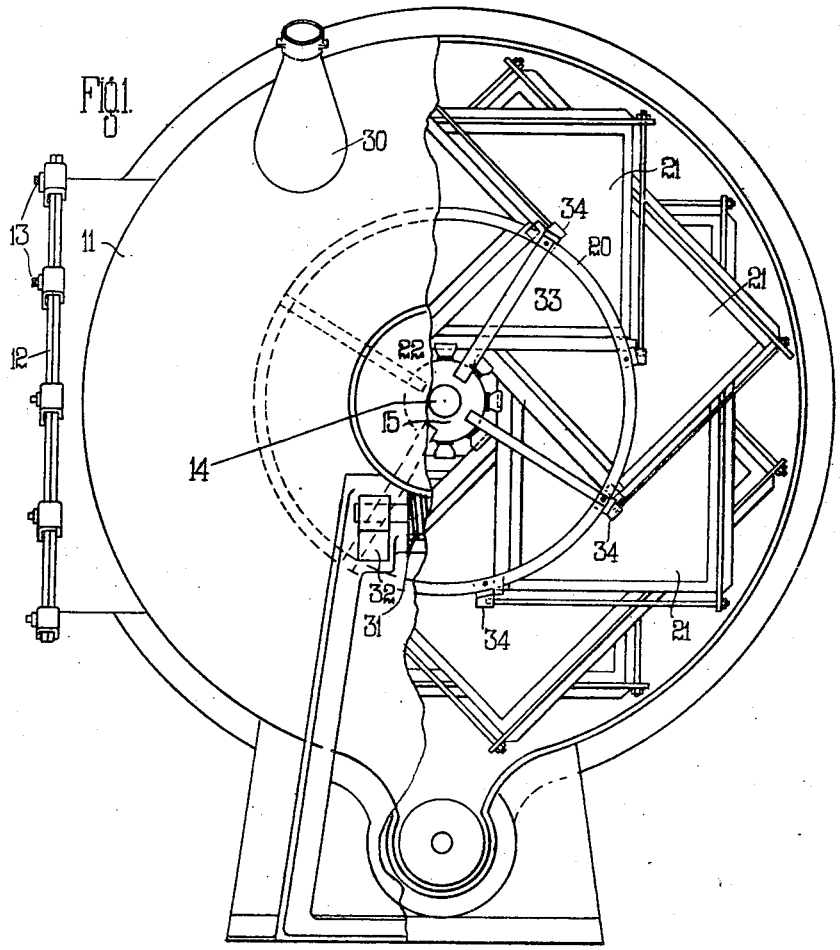

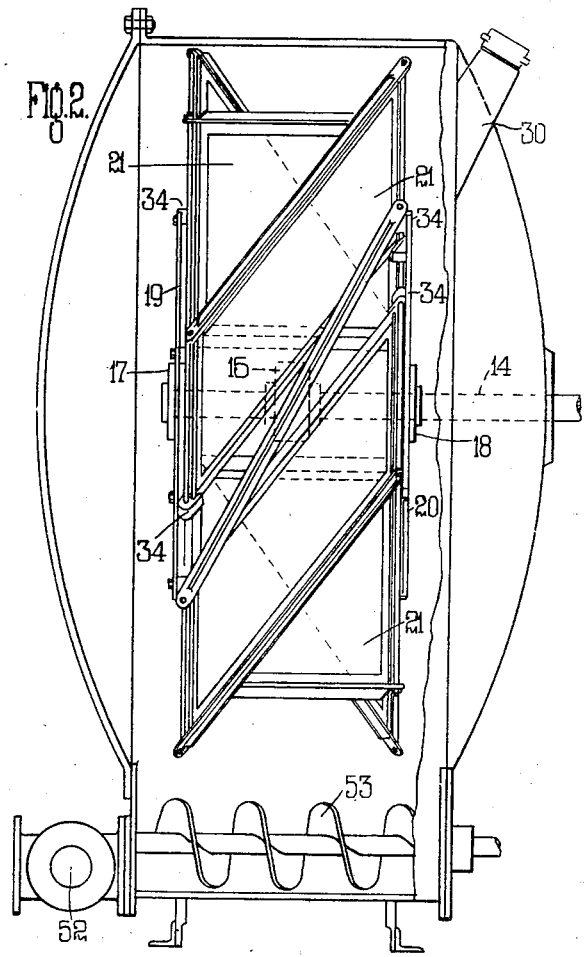

2,093,967

UNITED STATES PATENT OFFICE 2,093,967

FILTER

Edward Walter Wolfe Keene, Kingston-upon-Hull, England

Application March 22, 1937, Serial No. 132,392
In Great Britain February 24, 1936

6 Claims. (Cl. 210—200)

The present invention relates to filters or thickeners of the rotary type, wherein a plurality of filter leaves, each consisting of a net-work covered on both sides by a filter cloth, are adapted for rotation about a common axis within a drum or casing.

According to the present invention, the filter leaves, which preferably are of rectangular shape, are in hydraulic communication at their inner edges with drainage fittings carried by a cored trunnion shaft which carries a pair of longitudinally spaced hoops, each having thereon a plurality of circumferentially spaced lugs, each of which forms a seating for one end of said inner edge of a leaf.

Each filter leaf preferably has a bounding frame the inner edge of which is connected to the slotted transverse arm of a hollow T-shaped coupling member having a spigot connection, on the base of the trunk with a hollow annulus having radially cored holes to receive the spigots.

Preferably, the annulus has a number of flat circumferential sides equal to the number of spigots, so that rubber gaskets or the like jointing members may be inserted between the flanges on the trunks of the coupling members and the flat faces of the annulus so as to establish hydraulic communication between the leaves and the annulus.

The annulus may have a number of cells formed therein, one to each filter leaf, or may have a corresponding number of conduits each in connection with a tubed circular plate mounted upon the trunnion shaft so that fluid passing from the tank or drum, within which the filter leaves are located, may "bleed" through the coupling members, the annulus, and the hollow trunnion shaft.

Each lug on the longitudinally spaced hoops has secured thereto a screw threaded rod, whilst a plurality of clamp bars are each adapted to span the free end of the rod secured to a lug on one hoop and the free end of a second rod connected to a lug on the other hoop but in rear of the first lug in the direction of rotation of the hoops with the trunnion shaft.

Each leaf is seated between two lugs so disposed and each clamping bar engages with the outer edge of a leaf to hold it on its seat.

The invention is more particularly described with reference to the accompanying drawings, in which:—

Figure 1 is a front elevation of a filtering or thickening apparatus in accordance with this invention, part of the casing being broken to show the arrangement of the filter leaves.

Figure 2 is a side view of Figure 1.

Figure 3 is a view of one of the filter leaves arranged upon its supporting brackets on the carrier ring and on the hollow shaft, the leaf being broken transversely to show the construction.

Figure 4 is a detail, being longitudinal section through one side of the frame for the leaf mounted upon the supporting bracket upon the carrier ring.

Figure 5 is a rear view of the supporting bracket upon the carrier ring.

Figure 6 is an elevation of a preferred form of central drainage member with which each leaf is provided, a modified form of anchoring means for the leaf being shown in chain-dotted lines.

Figure 7 is a sectional side view of Figure 8.

Referring to the drawings, the filter drum or casing is shown at 11, said drum or casing having an inspection cover 12 secured thereto by a plurality of clamps 13. The orifice, closed by such cover, is disposed at an angle to both the horizontal and vertical to permit of inspection and withdrawal of the filter leaves.

Supported in bearings carried by one radial face of the drum 11 is a cored shaft 14, adapted to be continuously driven through the medium of suitable gearing such as a worm 31 and worm-wheel supported on brackets 32 carried by the supporting structure of the apparatus. The hollow shaft 14 has a hollow boss or annulus 15 the periphery of which is cored or ported, radially of the shaft, as indicated at 16, the said ports corresponding in number with the number of filter leaves of the apparatus.

The hollow shaft 14 has also a pair of longitudinally spaced collars or flanges 17, 18, which support a pair of longitudinally spaced hoops 19, 20 through the medium of spokes or arms 33.

Each hoop consists of a flat ring made up of a strip of steel or other metal circularly bent to have its extremities welded together, whilst the spokes or arms 33 may be similarly connected to the hoops 19, 20 and to the collars or flanges 17, 18.

It will be appreciated that this method of constructing the hoops is relatively simple and cheap when compared with the cost of forming hoops from castings as employed heretofore, and in addition produces a considerable reduction in the weight of the rotating masses.

The filter leaves 21 are supported between the spaced hoops 19, 20, and correspond in number with the ports 16 in the hollow boss or annulus 15, each leaf having a central coupling or drainage member 22 for engagement with an appropriate port 16.

The construction of filter leaf will be more readily apparent from a reference to Figure 3, parts of which are shown broken for this purpose, the filter leaf therein illustrated being shown in elevation in regard to the longitudinally spaced hoop which is shown in chain-dotted lines. Each filter leaf is of rectangular shape and has a foundation or core of metallic gauze 23 within a bounding frame 24 of U section which is secured along its lower longitudinal edge to a drainage conduit 25 by spot welding 50 (see Fig. 7). Such frame 24 and gauze 23 are interrupted at the region of the lower corners and at the mid point of the lower longitudinal edge adjacent the central drainage fitting so as not to unduly impede the flow of liquor into the drainage conduit 25. A filter cloth or fabric 26 is superposed upon each face of the metallic gauze 23, and is held in position thereon by a pair of rectangular frames 27, 28, and by bolts passed through the holes 29 in such frames and in the bounding frame of the gauze.

The function of the gauze 23, of course, is to impart rigidity to the cloths 26 and to resist the strain upon such cloths due to "building up" of the precipitate on the outer faces thereof, when filtering is being carried out, the residue of the filtered liquid passing through the cloths 26, ports 51 in the frame 24 and thence into the drainage conduit 25, through the central drainage member 22, and so to the member 15 and the shaft 14.

Each filter leaf is secured in position between the longitudinally spaced hoops 19, 20, by seating the extremities of its longitudinal lower edge within a pair of brackets one of which is indicated at 34 (Figures 3–5). Each bracket 34 has an arcuate rib 35 for determining its position upon the hoop 19, 20, and is secured to the hoop by a bolt 36 and a nut 36a. Each bracket is provided with an inclined lug 37 having a recess or seating 38 for the corner of the filter leaf, the brackets on the hoop 19 being positioned in relation to those on the hoop 20 so that the filter leaves may be supported in the appropriate positions across the hollow boss or enlargement 15.

It will be seen that when the leaves 26 are each held at the opposite ends of their inner edge by the lug 37 on the bracket 34 on one hoop 19 and by a lug 37 on a circumferentially spaced bracket 34 on the other hoop 20 they lie at an angle to the longitudinal axis of the shaft 14 and in overlapping relationship circumferentially about the same. To maintain their position relatively to the supporting hoops, the coupling members 22 may have each a pin or projection (not shown) engaging a slot with which each port 16 of the annulus is provided.

Each bracket 34 has a threaded hole or recess for the reception of a rod or spindle 39, which upstands from the brackets adjacent the side edges of the filter leaf. Thus, a clamping bar 40, passed on to the spindles or rods 39 of brackets supporting a filter leaf, may be secured thereto by nuts 41 screwed on to the upper threaded ends of the said rods or spindles 39 to put pressure upon the upper or outer edge of the filter leaf. Each clamping bar 40, is of inverted T-shape in cross section as indicated in Fig. 3.

Release of the filter leaves is effected solely by slackening of the screw-threaded nut connection 41, between the clamp bars 40 and rods 39 to relatively displace the clamp bars 40, and withdrawing the leaves and their coupling members radially of the tank or drum. As a result, axial displacement of the drum end wall is unnecessary for inspection, assembly, or removal of the leaves or for spray washing when required.

Spray washing of the leaves may be accomplished by means of a pipe, welded or otherwise secured to the tank or casing at the required angle, having communication with an external fitting 30 to a source of water supply.

As indicated more clearly in Figs. 6 and 7, each central drainage member 22 is substantially T shaped, the transverse arm of which is slotted as indicated at 42 for the reception of the lower edge of the drainage conduit 25. The hollow stem 43 of the drainage member forms a spigot connection with an orifice 16 in the hollow boss or enlargement 15 of the shaft, a rubber washer or other fluid tight gasket 44 (Fig. 5) being interposed between the lower edge of the transverse arm 41 and the said boss 15.

If desired, each filter leaf may be maintained in its position, relatively to the cored trunnion shaft, by a central rod 46 (Figs. 6 and 7) extending across the bounding frame of the leaf, through the hollow trunk of the coupling member, to have a screw threaded engagement with a collar 47, in the coupling member or with a ring mounted on said shaft and disposed internally of the annulus. The several central rods thus extend radially of the cored trunnion shaft across the filter leaves, and are each provided with a nut or other clamping means to establish hydraulic communication between the leaves and the annulus. Such arrangements of central rods may be in addition to or in substitution for the rods which extend from the lugs on the longitudinally spaced hoops and the clamping bars associated therewith, and may be particularly desirable where the filter leaves are of relatively large area or have an abnormal width relatively to their depth.

If desired alternate leaves may be of narrower width than intermediate leaves, that is to say between their inner and outer edges so as to avoid congestion of the drainage fittings at the center, the drainage fittings of such narrower filter leaves being increased in length to communicate with the hollow annulus. Again if desired each bracket may be provided with two lugs or recesses for the reception of a corner of each of two adjacent leaves whereby the leaves are supported in pairs between the hoops.

The liquor carrying matter in suspension is fed into the casing through one way of a two-way valve (52), whilst an overflow (not shown) may be provided at the top of the casing for an indication as to when the casing is full. The overflow may also be used as a safety valve for the release of excess pressure.

If desired, the filtering may be carried out under pressure. Compressed air may be also introduced into the casing conveniently through an opening in the top of the casing and the filtering action assisted by this pressure.

Where the density of the liquor to be filtered is relatively small an artificial filtering medium may be introduced into the liquor, that is to say, a second solid may be brought into suspension to assist the filtration.

The leaves may be covered with a fabric material, such as cotton, linen, silk or the like.

Where a sludge remains in the casing, and this sludge is of secondary consideration, the casing may be cleaned out by a worm screw 53 at the base of the casing, this worm screw passing the sludge through the second way of the valve 52. Where the sludge is of value, however, compressed air may be forced from the hollow annulus to cause the sludge to be blown from the leaves.

It will be seen that the inclined arrangement of the filter leaves relatively to the longitudinal axes of the shaft enables washing of the leaves to be effected without removal from the casing.

I declare that what I claim is:—

1. A rotary filter comprising a casing, an inlet to said casing for liquid carrying material in suspension, a hollow shaft within said casing and constituting an exhaust for filtered liquid, means to rotate said hollow shaft, hoops mounted on said shaft in longitudinally spaced relationship, a plurality of filter leaves supported between said hoops in directions inclined to said shaft and drainage fittings between the inner edges of said filter leaves and said hollow shaft for leading away filtered liquid from said leaves into said hollow shaft.

2. A rotary filter comprising a casing for liquid carrying material in suspension, a hollow shaft within and projecting beyond said casing to constitute an exhaust for filtered liquid, means to rotate said hollow shaft, hoops mounted on said shaft in longitudinally spaced relationship, circumferentially spaced lugs on said hoops, a plurality of filter leaves supported between said lugs in directions inclined to said shaft and drainage fittings between the inner edges of said filter leaves and said hollow shaft for leading away filtered liquid from said leaves into said hollow shaft.

3. A rotary filter comprising a casing, an inlet to said casing for liquid carrying material in suspension, a hollow shaft within and projecting beyond said casing to constitute an exhaust for filtered liquid, means to rotate said hollow shaft, hoops mounted on said shaft in longitudinally spaced relationship, circumferentially spaced lugs on said hoops, inclined seatings on said lugs, a plurality of filter leaves supported at the opposite ends of their inner edges in said seatings in directions inclined to said shaft, clamping means for retaining said hoops in said seatings, and drainage fittings between the inner edges of said filter leaves and said hollow shaft for leading away filtered liquid from said leaves into said hollow shaft.

4. A rotary filter as claimed in claim 3, wherein each of said clamping means comprises a pair of rods each connected at one end to a lug and extending adjacent an end edge of a filter leaf, and a clamping bar extending along the outer edge of a filter leaf and engaging the opposite ends of said rods.

5. A rotary filter comprising a casing, an inlet to said casing for liquid carrying material in suspension, a hollow shaft through said casing to constitute an exhaust for filtered liquid, means to rotate said hollow shaft, hoops mounted on said shaft in longitudinally spaced relationship, a plurality of filter leaves supported between said hoops in directions inclined to said shaft, a hollow enlargement of said shaft having radial ports therein and hollow spigot members between the inner edges of said filter leaves and the radial ports of the hollow enlargement of said hollow shaft for leading away filtered liquid from said leaves into said hollow shaft.

6. A rotary filter comprising a casing, an inlet to said casing for liquid carrying material in suspension, a hollow shaft within and projecting beyond said casing to constitute an exhaust for filtered liquid, means to rotate said hollow shaft, hoops mounted on said shaft in longitudinally spaced relationship, a plurality of filter leaves each comprising a pair of spaced filter elements held within a common frame which frames are supported between said hoops in directions inclined to said shaft and drainage fittings between the inner edges of each of the frames for said filter leaves and said hollow shaft for leading away filtered liquid from said leaves into said hollow shaft.

EDWARD WALTER WOLFE KEENE.